US 9,055,424 B1

(12) United States Patent
Gravette et al.

(10) Patent No.: US 9,055,424 B1
(45) Date of Patent: Jun. 9, 2015

(54) METHOD AND APPARATUS FOR ACCESSING DEVICE OR SERVICE SUPPORT USING A MOBILE DEVICE

(71) Applicant: StepOne, Inc., Austin, TX (US)

(72) Inventors: William T. Gravette, Austin, TX (US); Erik J. Noren, Cedar Park, TX (US); Alexander C. Mitchell, III, Shawnee, KS (US)

(73) Assignee: StepOne, Inc., Austin, TX (US)

( * ) Notice: Subject to any disclaimer, the term of this patent is extended or adjusted under 35 U.S.C. 154(b) by 162 days.

(21) Appl. No.: 13/713,295

(22) Filed: Dec. 13, 2012

Related U.S. Application Data

(60) Provisional application No. 61/570,061, filed on Dec. 13, 2011.

(51) Int. Cl.
*H04W 24/00* (2009.01)
*H04W 4/20* (2009.01)

(52) U.S. Cl.
CPC ..................... *H04W 4/20* (2013.01)

(58) Field of Classification Search
USPC ....................................... 455/423
See application file for complete search history.

(56) References Cited

U.S. PATENT DOCUMENTS

2005/0171661 A1* 8/2005 Abdel-Malek et al. ......... 701/33

* cited by examiner

*Primary Examiner* — Vladimir Magloire
*Assistant Examiner* — Frank Donado
(74) *Attorney, Agent, or Firm* — Campbell Stephenson LLP

(57) ABSTRACT

In one embodiment, a first mobile device reads first information associated with a first device or first service contained in a first asset tag. The first mobile device generates a first message in response to reading the first information, wherein the first message comprises the first information. The first mobile device transmits the first message to a computer system via a wireless communication link. The first mobile device receives a first reply in response to transmitting the first message. In response to the first mobile device receiving the first reply, the first mobile device displays first content for a user of the first mobile device to diagnose and/or solve a problem with the first device or first service.

6 Claims, 2 Drawing Sheets

METHOD AND APPARATUS FOR ACCESSING DEVICE OR SERVICE SUPPORT USING A MOBILE DEVICE

CROSS-REFERENCE TO RELATED APPLICATIONS

This application claims the domestic benefit under Title 35 of the United States Code §119(e) of U.S. Provisional Patent Application No. 61/570,061 entitled "Method and Apparatus for Accessing Device or Service Support Using A Mobile Device," filed on Dec. 13, 2011, and naming William T. Gravette; Erik J. Noren; and Alexander C. Mitchell, III as inventors. The above-referenced application is hereby incorporated by reference, in its entirety and for all purposes.

BACKGROUND

Call centers are often operated by a company to administer support for customers who have purchased a device (e.g., set-top box, router, computer, video game console, etc.) or a service (e.g., cable television, Internet access, email, etc.). Call centers are expensive. Call centers are operated through an extensive open work space for call center agents, with work stations that include a computer for each agent, a telephone set/headset connected to a telecom switch, and one or more supervisor stations. The agents receive telephone requests from customers who seek support for their device or service. The term support includes configuring or reconfiguring a device or service, diagnosing a problem with the device or service, providing a solution to the problem or service, etc. The present invention will be described with reference to diagnosing and/or providing a solution to a problem with a device or service, it being understood the present invention should not be limited thereto.

As an alternative to call centers staffed with agents, many companies have implemented less expensive, automated systems to handle requests for support from customers. These automated systems execute on computer systems (e.g., servers) that can be accessed via the internet. Unfortunately, automated systems may be difficult for customers to find, access and use, particularly for those customers who are not technically inclined. Customers who lack the appropriate skills or experience with automated systems are often hesitant to use them. Moreover, for those customers who use automated support systems, inaccurate or unreliable data or confusion on the part of the consumer in determining how to obtain the proper support for their requests may result in customer dissatisfaction.

BRIEF DESCRIPTION OF THE DRAWINGS

The present invention may be better understood, and its numerous objects, features and advantages made apparent to those skilled in the art by referencing the accompanying drawings. The use of the same reference number throughout the figures designates a like or similar element.

DETAILED DESCRIPTION

The present invention relates to a system and method for accessing automated support content for a device or service via a mobile device such as a smart phone. Access to automated support content should be intuitive, and easy to initiate. There should be a clear association between the problem a customer may have with a device or service and a direct path to automated support content for the problem. The present invention may reduce the number of steps that are required to reach the beginning of an automated support content that is needed to diagnose and/or solve the problem, when compared to prior methods of accessing the same automated support content. The present invention may provide access to automated support content for any one of a variety of devices or services that are provided by any one of a number of different companies.

In general the present invention can enable users to more easily and intuitively access automated support content for different types of device and/or service. Moreover, the present invention can enable users to more easily and intuitively access separate automated support systems that are provided by different companies (e.g., cable television providers) for respective devices and/or services. Other aspects of the present invention are contemplated.

Figure 1:
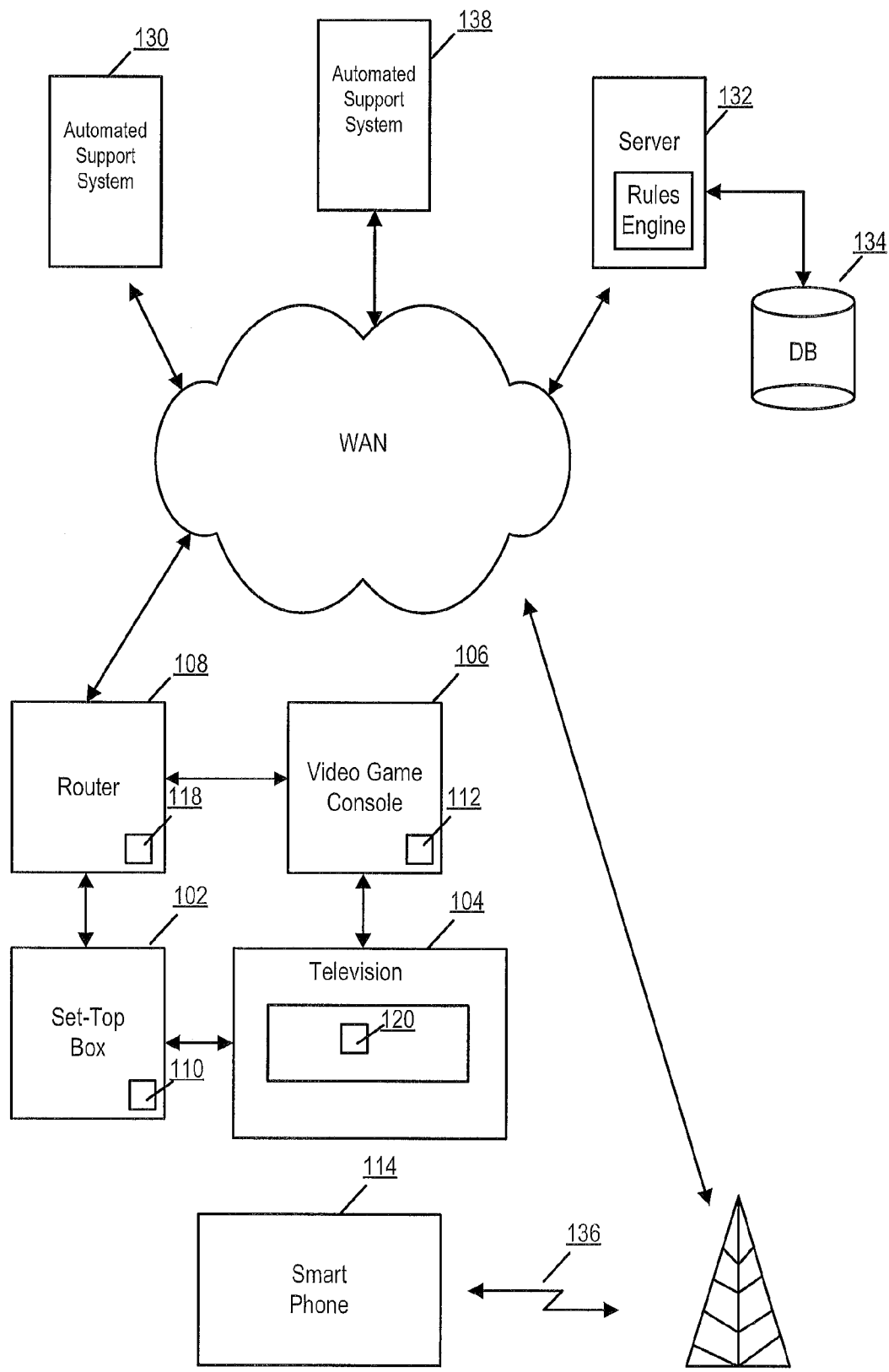
FIG. 1 illustrates certain components of a system employing one or more embodiments of the present invention.

FIG. 1 illustrates a system in which the present invention can be employed. The system shown in FIG. 1 is an example and should not limit the scope of the present invention. FIG. 1 illustrates multiple devices and services that can be supported by an automated process. The system shown includes a set-top box 102 coupled to a television 104 having a display screen; a video game console 106 coupled to the television 104; and a router 108. Although not shown, several services such as cable television, Internet access, etc. are provided via one or more of the devices. The present invention will be described with reference to accessing automated support content for set-top box 102, it being understood the present invention can be employed to access automated support content for television 104, console 106, and router 108 in addition to accessing automated support content for other devices (e.g., computer systems, appliances, home security systems, etc.) or services.

Set-top box 102, video game console 106, and router 108 have physical asset tags 110, 112, and 118, respectively, attached to them. Television 104 can display a virtual asset tag 120 that is dynamically generated by set-top box 102 or video game console 106. An asset tag may store static, readable information about its corresponding device or service. In one embodiment, the asset tag may store a tag identifier, which in turn can directly or indirectly identify a record in a database or other data object that stores information about the corresponding device or service, such as a product number, serial number, date of purchase, Internet address, encryption key, firmware name and/or version number, name of service and/or device provider, identity of subscribed services, service activation date, order pending, technician visits, etc. The asset tag may include additional static, readable information about a corresponding device or service. Virtual asset tags may further include dynamic, readable information (e.g., current device configuration settings, self-diagnostic information, etc.) about its corresponding device or service.

Asset tags 110, 112, 118, and 120 store distinct information, which can be read and used to access respective automated support content such as workflows for solving a problem with a device or service as will be more fully described below. While asset tags contain distinct tag identifiers, when and asset tag is first produced or attached to a product, the tag identifier may or may not directly or indirectly identify a database record or other data object that stores information about the product or a service. If an asset tag has a specific tag identifier that does not directly or indirectly identify a database record or other data object, then a provisioning service (not shown) may be used to perform such association. The provisioning service may interface with another system in which the asset tags are scanned along with a unique identifying label for the device or service in order to create an association between the tag identifier and a device or service identification. The device or service identification may, in turn, be associated with a record in a database or other data object.

In one embodiment, asset tag information, which may be or include the tag identifier, may be encoded in a quick response (QR) code in either the physical or virtual asset tag. QR code is a type of matrix bar code or two-dimensional code. The QR code has become popular due to its fast readability and large storage capacity compared to standard UPC barcodes. The code typically consists of black modules (square dots) arranged in a square pattern on a white background. Asset tag information embedded in a QR code can be read using a QR scanner of, for example, a mobile device (e.g., a smart phone) 114. The present invention will be described with reference to use of a smart phone to read data of an asset tag, it being understood that other mobile devices (e.g., tablet computers, net-book computers, etc.) are contemplated. Alternatively asset tag information may be encoded in a near-field communication (NFC) chip of a physical asset tag. NFC allows for simplified data exchange between itself and an NFC reader of, for example, smart phone 114. For purposes of example only, each physical asset tag 110, 112, and 118 includes both a QR code and an NFC chip that encode asset tag information. Virtual asset tag 120 does not include an NFC chip.

In one embodiment, the physical asset tags contain both a QR code and a NFC chip. Additional tag mediums are contemplated as are single medium tags. To enable a single asset tag to work across one or multiple mediums and to accommodate new mediums in the future, an encoding algorithm can be employed that combines an asset tag identifier and a tag medium identifier. The combined tag identifier and tag medium identifier are encoded using an encoding algorithm and the result is stored on the appropriate medium.

The data storage capacity of QR codes and NFC chips is limited. More asset tag information such as settings from a device or service, can be stored on these mediums if data compression is employed. In one embodiment, various compression techniques can be used to store more information within the available data space available based on the medium (e.g., QR code or NFC chip). Techniques employed include use of special numeric bases and dynamic lookup tables. Other techniques are also contemplated.

Sometimes it is necessary to secure the asset tag information, which is encoded into a tag medium (e.g., QR code or NFC chip) and transmitted to a server. Because many mediums and transmission protocols (HTTP GET, for example) are inherently not secure, a data security protocol can be used in one embodiment. The security protocol allows for secure, encrypted storage of sensitive information on otherwise insecure mediums. The security protocol also allows for secure, encrypted transmission of sensitive information to a server via insecure transmission protocols. In one embodiment a mechanism can be employed for identifying which asset tag information is secure and which is not. Only information identified as secure will be encrypted. Secure encrypted data can be stored and transmitted alongside information which is not secure or encrypted.

FIG. 1 includes smart phone 114 having a QR scanner and an NFC reader that can read asset tag information of a QR code and/or a NFC chip of asset tag 110, 112, 118, or 120. In general, when a user seeks automated support for a device or service, the user can easily access the support through smart phone 114. More particularly, the support can be accessed by first scanning or reading the asset tag information using the QR scanner or NFC reader of smart phone 114. For purposes of explanation only, the present invention will be described with to a problem a user is experiencing with set top box 102 or a service provided there through. As such, the present invention will be described with reference to smart phone 114 reading asset tag information of asset tag 110. This asset tag identifier of the asset tag 110 directly or indirectly identifies a database record or other data object that contains information about set top box 102 or service provided via set top box 102.

Smart phone 114 can transmit a request message for automated support to computer system (e.g., server) 132. This request may include asset tag information, including the asset tag identifier, read by the QR scanner or NFC reader. The request may also include additional information such as information about the owner of smart phone 114, which can be found in memory of the smart phone 114. In one embodiment, if the asset tag stores compressed information, smart phone 114 may decompress the information scanned or read from the asset tag before it is transmitted in the request to server 132. In another embodiment, server 132 may decompress information included in a request message.

A rules engine, which may take form in instructions executing on one or more processors of server 132, can receive the support request message. The rules engine can access and read a database record or other data object using the tag identifier of the received request message in order to retrieve information (e.g., serial number, manufacturer, service activation date, etc.) about, for example, set top box 102 or the service provided there through. The rules engine can then process the information from the database record or other data object contained in the request message to identify and select an automated support system from among several automated support systems that will help address the problem with set top box 102 or its service. Each of the automated support systems may include multiple sets of support content, including workflows, videos, articles, etc., that support respective devices or services. If the selected automated support system contains several distinct support content items, the rules engine may use the information read from the database record or other data object, in addition to other information (e.g., device or service configuration information, diagnostic information, etc.) to identify a support content item that is most appropriate for addressing the problem with the device or service. The rules engine can update and send the request message via the WAN (e.g., Internet) to a computer system (e.g., server) 130 that implements the selected automated support system. The updated request may include information identifying the smart phone 114 and/or the owner thereof. The updated request may include an identity of the content item (e.g., workflow) of the automated system that was selected and particularly well suited to support the device (e.g., set-top box 102). The updated request may include the Internet address of the device (e.g., set top box 102) that can used to enable the selected automated system to remotely access the device (e.g., set top box 102) in accordance with the selected content item to gather configuration information, run diagnostic tests, gather diagnostic information, etc. The updated request may include dynamic asset tag information read from a virtual tag such as device configuration settings or self-diagnostic test information, which can be used by the selected content item (e.g., workflow) in diagnosing or correcting a problem with the device, which may eliminate the need to remotely access the device. The request may include additional information generated by the rules engine or provided by the smart phone 114.

When the selected automated system receives the updated request from the rules engine, the selected automated system generates and sends a reply to the smart phone 114, which can be identified in the updated request, that contains the relevant content selected by the rules engine. In response to receiving the reply, smart phone 114 can present the relevant content, which is not limited to, but could include the presentation of a menu of options, the playing of a video, or the initiation of a workflow. Other content types are also contemplated. When presented, the content, such as a workflow, can establish an automated support session for the user via smart phone 114. This support session supports the device (e.g., set-top box 102) and may include a step-by-step process that is displayed by the smart phone to enable the user of the smart phone to manually diagnose and fix a problem with the device. The session may alternatively display a button on smart phone 114 that, when activated by the user, prompts the selected automated support system to remotely diagnose and fix a problem with the device (e.g., set-top box 102).

In another embodiment, the asset tag identifier and other information read via the QR scanner or NFC reader of smart phone 114 can be processed by an automated support system that is native to the smart phone 114 in order to select one of many multiple sets of content items such as a workflow that are stored in smart phone for supporting respective devices or services. The native support system can select and initiate a content item suitable for supporting the device based on the asset tag information. The content item, when initiated, can start a support session with the user of the smart phone 114. This session may include a display a step-by-step process by the smart phone of to enable the user of the smart phone to manually trouble shoot and correct a problem with the device (e.g., set-top box 102).

Figure 2:
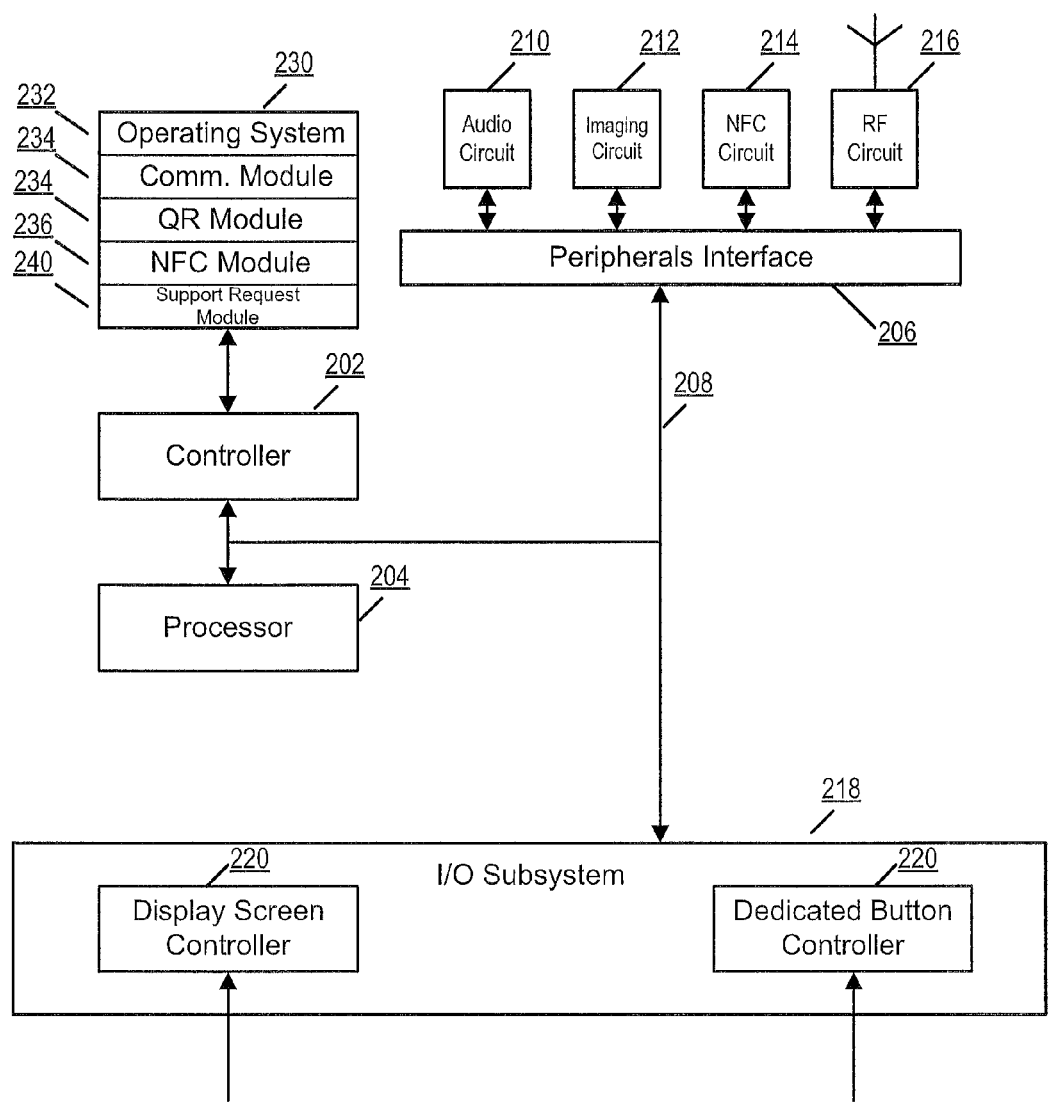
FIG. 2 illustrates certain components of a mobile device employing one or more embodiments of the present invention.

As noted above, smart phone 114 includes a QR scanner and an NFC reader. FIG. 2 illustrates in block diagram form, additional components of an example smart phone 114, it being understood the term "smart phone" should not be limited thereto. With continuing reference to FIG. 1, smart phone 114 includes a memory controller 202 coupled to a processor 204 and a peripherals interface 206. The various components of smart phone 114 may be coupled by one or more communication buses or signal lines 208. The peripherals interface 206 is coupled to an audio circuit 210, and imaging circuit 212 of a camera (not shown), an NFC reader circuit 214, and a radio frequency (RF) circuit 216. The imaging circuit 212 can generate signals corresponding to asset tag identifiers and other information embedded in a QR code of a virtual or physical asset tag that is scanned by camera (not shown). The NFC circuit 214 can generate signals corresponding to asset tag identifier and other information embedded in an NFC chip that is read by the NFC reader.

The peripherals interface 206 is coupled to and I/O subsystem 218 that contains various controllers that interact with other components of smart phone 114. I/O system 218 includes a display screen controller 220 coupled to the display screen (not shown) of the smart device, which can be used during a support session to, for example, display a step-by-step manual process provided by a workflow of an automated support system for diagnosing and correcting a problem with a device such as set-top box 102 or the service provided there through.

Memory controller 202 is coupled to a memory 230, which may take form in one or more types of computer readable memory. Memory 230 stores several software components or modules that can be executed on processor 204. For example, memory 230 includes an operating system 232, and a communication module 234 which enables communication between smart phone 114 and server 132 or server 138 via communication link 136 and RF circuit 216. Additionally, memory 230 includes a QR module 234, NFC module 236, and support request module 240. QR module 234 is capable of receiving and processing signals from imaging circuit 212 in order to reproduce asset tag information of a scanned physical or virtual asset tag. NFC module 236 is capable of receiving and processing signals received from NFC circuit 214 in order to reproduce asset tag information read from a physical asset tag. Support request module 240, which is in data communication with NFC module 236 and QR module 234, is capable of processing asset tag information generated by NFC module 236 or QR module 234. The request module 240 is also capable of generating a support request message for subsequent transmission to server 132 via communication module 234 and wireless communication link 136. The request module 240 is also capable of interaction with relevant content (e.g., workflow) provided by, for example, the automated support system of sever 138 during a device support session. Alternatively, support request module 240 may simply implement the native automated support system mentioned above. Although not shown, additional components within memory 230 may contain information that is unique to the particular smart phone 114. For example, the additional information may include the identification of an owner of smart phone 114, or a list of devices that can be supported by automated support systems. Further information unique to smart phone 114 and stored in memory 230 is contemplated.

As noted above, devices such as set-top box 102, console 106, or router 108 are subject to problems that can be supported by, for example, automated support system executing on server 130 or server 138 via smart phone 114 and the rules engine executing on server 132. When a problem occurs, a user can seek the support via smart phone 114. To illustrate, suppose a problem exists with set-top box 102 that inhibits its ability to receive content from a cable television provider. In this situation, a user can scan the QR code or read the NFC chip of physical asset tag 110 using smart phone 114. For purposes of explanation only, it will be presumed that the user scans the QR code of physical asset tag 110.

In response to scanning the QR code, imaging circuit 212 can generate signals corresponding to the asset tag identifier and/or other information that is embedded in the QR code. QR module 234 can process the signals from imaging circuit 212 to reproduce the asset tag identifier and/or other information. This asset tag identifier and/or other information can then be provided to request module 240. In one embodiment, request module 240 generates and sends a support request message to server 132 via wireless communication link 136. This request message may include at least some or all of the asset tag identifier and/or other information from QR module 234. Additional information stored in memory 230 may be sent with the request message.

In response, the rules engine of server 132 may use the asset tag identifier to access data mapped thereto in database 134 that is relevant to set-top box 102. This data, in turn, can be used by the rules engine to eventually forward to smart phone 114 a solution to the problem with set-top box 102. For example, the rules engine may use the serial number of the set-top box 102 stored in database 134 and other information that is needed to identify and select automated support system on server 138 (as opposed to the automated support system executing on server 130) as the appropriate system for providing automated support to smart phone 114. Further, the rules engine may use information of the support request message and information mapped in database 134 to identify a content item of automated system on server 138 for diagnosing and/or correcting the problem with set-top box 102. Thereafter, the rules engine may update the support request with an indication of the selected content, and send the request to the selected automated support system. When the automated support system receives the support request from the rules engine, in one embodiment, the selected content item may remotely access set-top box 102 to read configuration information or other information stored therein. The other information may include self-diagnostic information gathered by set-top box 102. The content item may process the configuration information and other information received from set-top box 102 and attempt to identify one or more problems thereof. If the problem is diagnosed, the content item may generate and implement a solution to fix the problem. Alternatively, the server implementing the selected automated support system can transmit relevant content regarding the solution to smart phone 114 via a reply message. Request module 240 of smart phone 114 receives the reply message and its support content via wireless communication link 136 and communication module 234. In response, request module processes the relevant content for subsequent display on a screen of smart phone 114 as a solution for solving the problem. The displayed solution may take form in a series of steps to be implemented by the user against set-top box 102 for the purpose of correcting the problem thereof. In a preferred embodiment, the displayed solution information may include a button, that when activated, instructs a content item (e.g., workflow executing on server 138) to remotely access and fix the problem with set-top box 102 via the WAN. In response to receiving this activation, server 138 remotely implements the solution to correct the problem with set-top box 102.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A method comprising:
a computer system receiving a first message from a first mobile device via a first wireless communication link, wherein the first message comprises first information read from a first asset tag by the first mobile device;
the computer system accessing a database to read additional first information mapped to the first information;
the computer system selecting an identity of a first automated support system from among identities of a plurality of support systems, wherein the identity of the first automated support system is selected by the computer system based on the additional first information, wherein the first automated support system comprises a plurality of content support items;
the computer system selecting an identity of a first support content item of the plurality of support content items, wherein the identity of the first support content item is selected based on the additional first information;
the computer system receiving a second message from a second mobile device via a second wireless communication link, wherein the second message comprises second information read from a second asset tag read by the second mobile device;
the computer system selecting an identity of a second automated support system from among identities of the plurality of support systems, wherein the identity of the second automated support system is selected by the computer system based on the second information;
the computer system generating and sending a third message to a first computer system that implements the first automated support system, wherein the third message comprises the identity of the first support content item;
the computer system generating and sending a fourth message to a second computer system that implements the second automated support system.

2. The method of claim 1 wherein the first information is associated with a first device, wherein the second information is associated with a second device, wherein the first and second devices are distinct types of devices.

3. The method of claim 1 wherein the first information is associated with a first service, wherein the second information is associated with a second service, wherein the first and second services are distinct types of services.

4. The method of claim 1 wherein the second computer system comprises another plurality of content items stored in memory accessible by the second computer system, and wherein the method further comprises the computer system selecting an identity of a second of the other plurality of content items, wherein the first support content item is distinct from the second content item.

5. The method of claim 1 wherein the first information comprises an identification of a first device or service, and configuration settings for the first device or service.

6. A non-transitory memory storing instructions executable by one or more processors of a computer system to implement a method, the method comprising:
the computer system
receiving a first message from a first mobile device via a first wireless communication link, wherein the first message comprises first information read from a first asset tag by the first mobile device;
the computer system accessing a database to read additional first information mapped to the first information;
the computer system selecting an identity of a first automated support system from among identities of a plurality of support systems, wherein the identity of the first automated support system is selected by the computer system based on the additional first information, wherein the first automated support system comprises a plurality of content support items;
the computer system selecting an identity of a first support content item of the plurality of support content items, wherein the identity of the first support content item is selected based on the additional first information;
the computer system receiving a second message from a second mobile device via a second wireless communication link, wherein the second message comprises second information read from a second asset tag read by the second mobile device;
the computer system selecting an identity of a second automated support system from among identities of the plurality of support systems, wherein the identity of the second automated support system is selected by the computer system based on the second information;
the computer system generating and sending a third message to a first computer system that implements the first automated support system, wherein the third message comprises the identity of the first support content item;
the computer system generating and sending a fourth message to a second computer system that implements the second automated support system.

* * * * *